Aug. 7, 1934.    W. H. DOBLE    1,969,123
APPARATUS FOR BUILDING UP SHORE LAND AND BEACHES
Filed Feb. 21, 1933    3 Sheets-Sheet 2
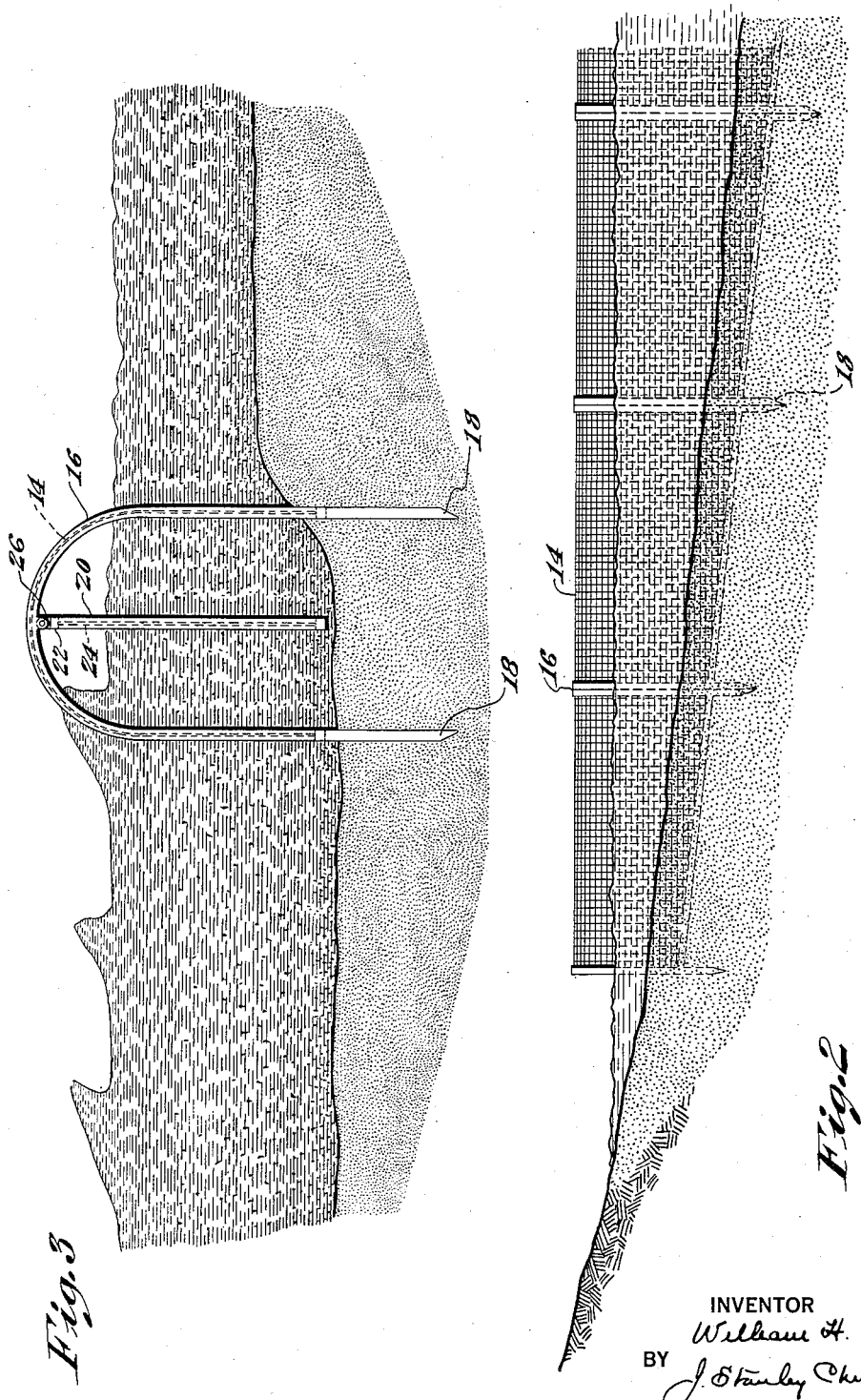
INVENTOR
William H. Doble
BY J. Stanley Churchill
ATTORNEY Aug. 7, 1934.  W. H. DOBLE  1,969,123
APPARATUS FOR BUILDING UP SHORE LAND AND BEACHES
Filed Feb. 21, 1933  3 Sheets-Sheet 3
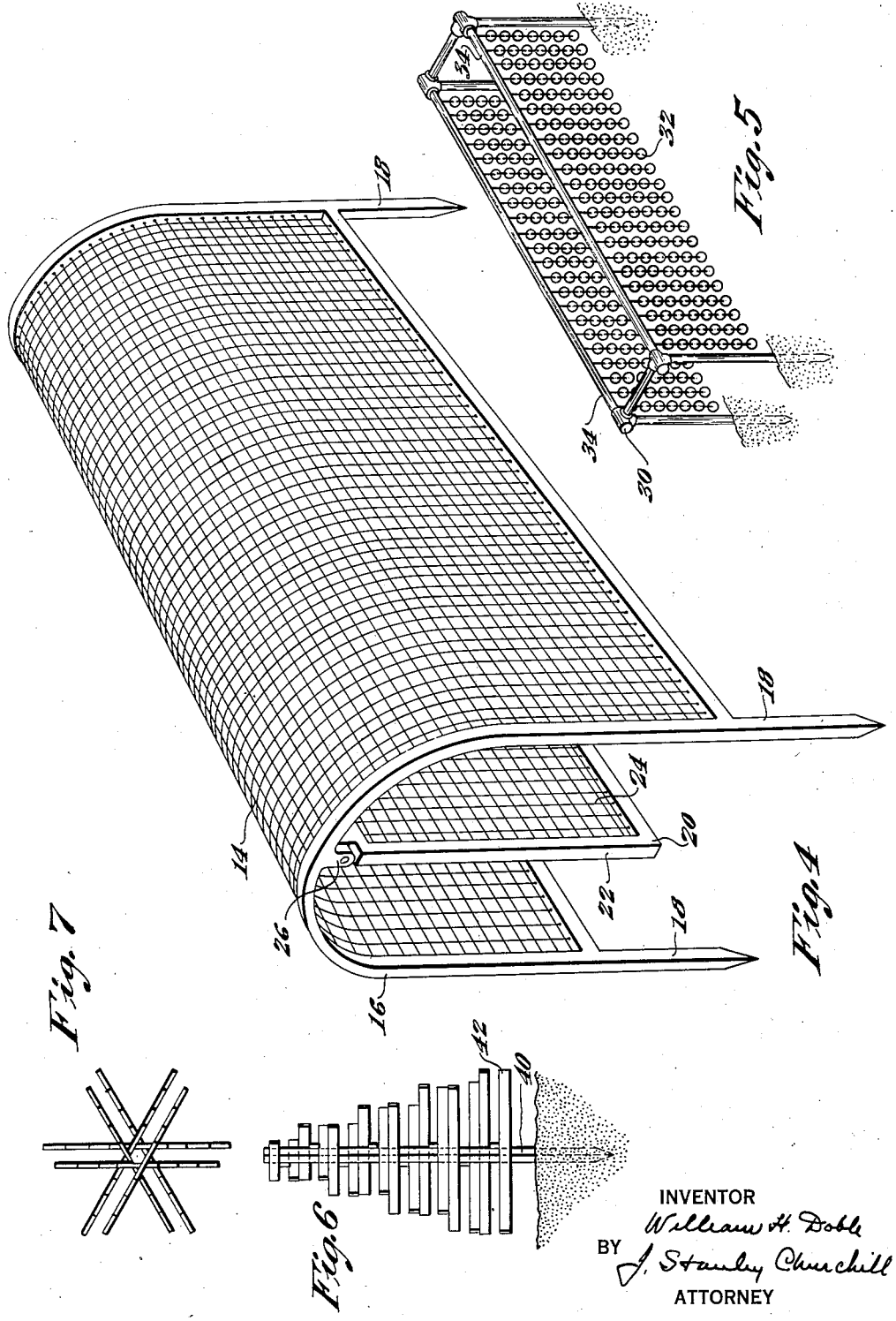
INVENTOR
William H. Doble
BY J. Stanley Churchill
ATTORNEY Patented Aug. 7, 1934

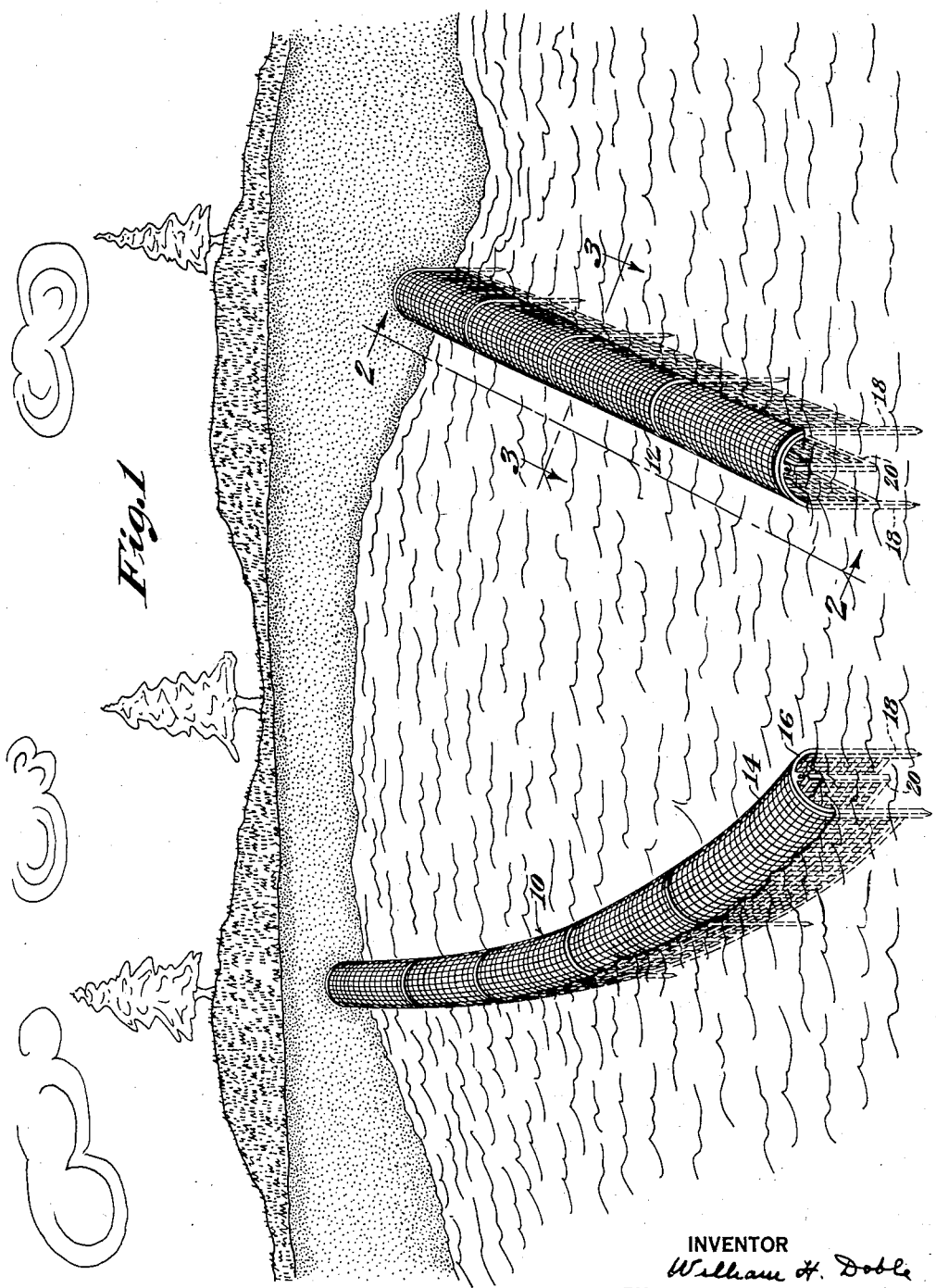

1,969,123

UNITED STATES PATENT OFFICE 1,969,123

APPARATUS FOR BUILDING UP SHORE LAND AND BEACHES

William H. Doble, West Harwich, Mass.

Application February 21, 1933, Serial No. 657,783

3 Claims. (Cl. 64—4)

This invention relates to a method of and to apparatus for building up shore land and beaches.

The object of the invention is to provide a novel and practical method of and apparatus for building up seashore land or beaches, by which the effect of excessive waves during storms in washing away such land may be avoided and the beach or land built up.

With this general object in view, and such others as may hereinafter appear, the invention consists in the method of and in the apparatus for building up shore land and beaches, hereinafter described and particularly defined in the claims at the end of this specification.

In the drawings illustrating the preferred apparatus for practicing the present invention, Fig. 1 is a perspective view illustrating a beach or shore provided with apparatus for building up a section thereof; Fig. 2 is a longitudinal section taken on the line 2—2 of Fig. 1; Fig. 3 is a cross-section taken on the line 3—3 of Fig. 1; Fig. 4 is a perspective view illustrating one form of apparatus for use in practicing the present invention; Fig. 5 is a similar view illustrating an alternate form of apparatus; and Figs. 6 and 7 are views in plan and elevation of still another form of apparatus for use in practicing the present invention.

Prior to the present invention, the prevention of seashore land and beaches from being washed out under the effect of waves, particularly during storms, has presented a most serious problem. The continual pounding of waves upon the beach or shore land gradually washes out the sand upon each recoil of a wave, and many attempts to prevent the destruction of shore property and beaches have heretofore been made. As far as I am aware, however, none of these attempts have been particularly successful and all of them have in general been directed to the erection of breakwaters or jetties usually built, at great expense, of heavy stone, rock, or of masonry, and arranged to project outwardly into the ocean substantially perpendicular to the shore line. All of these breakwaters have been permanent and rigid and are not adapted for repositioning for wind and tide variations, and when a wave strikes the rigid breakwater it rebounds with equal force and the effect and force of the waves continue unbroken to wash out the sand and beach on the exposed side of the breakwater.

In accordance with the present invention the section of the shore or beach to be built up is provided with one and preferably with two projecting wave eliminators of a perforate construction such as to permit movement of the water therethrough and the construction of which at the same time is such as to substantially destroy the wave motion and to render the body of water on the unexposed side of the wave eliminator relatively quiescent. During a storm the waves pounding upon a beach gradually pick up and wash away the sand carrying it in suspension. During the forward and rearward movement of the waves this suspension of sand in the water is moved gradually outwardly from the shore. When such a suspension of sand in the water impinges upon such a perforate construction of wave eliminator the water carrying the sand in suspension passes through the same into the space on the unexposed side thereof, and at the same time substantially all wave motion is destroyed during the passage of the water through the wave eliminator, so that an opportunity is afforded for the suspended sand to gradually settle, from the relatively quiescent body of water on the unexposed side of the wave eliminator, and as a result the deposited sand gradually builds up the shore in the vicinity of the wave eliminator.

In practicing the present invention various forms and constructions of wave eliminator may be used, all of which are characterized by being perforate and still offering sufficient resistance to the waves striking thereagainst to substantially eliminate the wave motion from the body of water passing therethrough. The perforate character of the present wave eliminator in permitting a wave to pass therethrough eliminates the recoil which has heretofore accompanied the impingement of a wave against a rigid breakwater and the accompanying washing out of the sand upon the recoil of the wave from the portion of the shore on the exposed side of the breakwater.

Referring now to the drawings, in practicing the invention I prefer to utilize two wave eliminators 10, 12 which may be spaced a moderate distance apart, such for example as thirty to forty feet, and arranged to converge from spaced points upon the shore. The wave eliminators are preferably of a length to extend at least from high to low water mark and of sufficient height to project above the surface of the water. One of the wave eliminators may and preferably will be disposed in the direct path of the waves produced under the most frequent storms. As herein shown, the wave eliminators 10, 12 may each comprise perforate cages comprising a heavy wire mesh 14 of substantially one inch perforations secured to a series of U-shaped standards 16 having leg portions 18 sufficiently long to enable them to be driven firmly into the shore or beach, as illustrated in Figs. 1 and 3. The cages may be provided with a central vane or flap member 20 also perforated and preferably comprising a metal framework 22 to which similar wire mesh 24 is secured. The metal framework 22 may be pivoted upon links 26, as illustrated in Fig. 3, so as to permit the flap member to swing and as a result of its movement to assist in eliminating the wave motion in the water passing therethrough.

In Figs. 5 and 6 I have illustrated other forms of wave eliminators which may be used for practicing the present invention, that in Fig. 5 comprising a framework 30 adapted to be driven into the beach and having a series of chains 32 pivoted to the crossbars 34 of the framework, to permit the water to move therethrough and to offer sufficient resistance, however, to eliminate the wave movement. In Fig. 6 I have illustrated another form of wave eliminator comprising a series of posts 40 provided with crossbars 42, the whole being arranged when driven into the beach to form a perforate fence through which the water may pass, while the crossbars function to eliminate the wave motion.

From the description thus far and from an inspection of Figs. 1, 2, and 3, it will be apparent that the wave eliminators provide in effect a settling area into which a suspension of sand in water is gradually moved by the impingement of waves against one or both of the wave eliminators, so that after the beach has been built up to a desired height upon the unexposed side of a wave eliminator or between the wave eliminators, if two be used, then the wave eliminators may be successively moved to adjacent sections, and any desired area gradually built up.

Experience has demonstrated that the present invention may be used not only to successfully prevent further washing away of a section of a beach or shore, but in addition has demonstrated it to be possible to build up sections of the beach or shore by the deposition of sand which is carried in suspension in the water during periods when the ocean is turbulent and wavy, and particularly during storms. The results thus far have indicated it to be possible to build up a beach to the extent of many inches, enabling the formation and maintenance of desirable and valuable sandy beaches.

While the preferred forms of the apparatus for practicing the invention have been herein illustrated and described, it will be understood that the invention may be embodied in other forms within the scope of the following claims.

Having thus described the invention, what is claimed is:—

1. In combination with a sand beach, a plurality of spaced apart spillage force eliminators secured to the beach at points intermediate high and low water marks thereof and projecting substantially perpendicularly from the shore, said eliminators being constructed of material having perforations sufficiently large to permit both the water and the entrained sand in the films of water being successively discharged upon the beach to pass therethrough but to be converted thereby into relatively quiescent bodies of water between said force eliminators whereby sand is caused to deposit therefrom upon the section of the beach between the eliminators to build up the same.

2. In combination with a sand beach, a plurality of spaced apart spillage force eliminators secured to the beach at points intermediate high and low water marks thereof and projecting substantially perpendicularly from the shore, each of said force eliminators being provided with spaced parallel walls and each wall of said eliminators being constructed of material having perforations sufficiently large to permit both the water and the entrained sand in the films of water being successively discharged upon the beach to pass therethrough, but to be converted thereby into relatively quiescent bodies of water between said force eliminators whereby sand is caused to deposit therefrom upon the section of the beach between the eliminators to build up the same.

3. In combination with a sand beach, a plurality of spaced apart spillage force eliminators secured to the beach at points intermediate high and low water marks thereof and projecting substantially perpendicularly from the shore, each of said force eliminators being provided with spaced parallel walls and with a central movable vane disposed therebetween, each of said walls and said vane being constructed of material having perforations sufficiently large to permit both the water and the entrained sand in the films of water being successively discharged upon the beach to pass therethrough, but to be converted thereby into relatively quiescent bodies of water between said force eliminators whereby sand is caused to deposit therefrom upon the section of the beach between the eliminators to build up the same.

WILLIAM H. DOBLE.